United States Patent

[11] 3,607,892

[72] Inventors Gerald H. Reifenberg
Hightstown;
William J. Considine, Somerset, both of N.J.
[21] Appl. No. 742,165
[22] Filed July 3, 1968
[45] Patented Sept. 21, 1971
[73] Assignee M & T Chemicals Inc.
New York, N.Y.

[54] CATALYTIC ADDITION OF STANNE TO OLEFINS
14 Claims, No Drawings
[52] U.S. Cl. .................................................. 260/429.7
[51] Int. Cl. .................................................. C07f 7/22
[50] Field of Search .......................................... 260/429.7

[56] References Cited
FOREIGN PATENTS
1,212,531 2/1961 Germany ..................... 260/429.7
OTHER REFERENCES
Neumann et al. (II), Angewandte Chemie, Vol. 2, No. 4, (1963), pages 165– 175, QD1Z5

Primary Examiner—Tobias E. Levow
Assistant Examiner—Werten F. W. Bellamy
Attorneys—Kenneth G. Wheeless, Lewis C. Brown and Robert P. Grindle ABSTRACT: This invention comprises a method for producing tetraorganotin compounds comprising reacting stannane, $SnH_4$, and a compound selected from the group consisting of α-olefinic compounds and cycloolefinic compounds in the presence of a catalyst and recovering said tetraorganotin compounds.

CATALYTIC ADDITION OF STANNE TO OLEFINS

This invention relates to a novel process for the manufacture of organotin compounds.

This invention for the production of tetraorganotin compounds comprises the catalytic reaction of stannane, $SnH_4$, and a compound selected from the group consisting of α-unsaturated olefinic compounds and cycloolefinic compounds in the presence of a catalyst and recovering said tretraorganotin compounds.

According to another of its aspects, the method of this invention for producing tetraorganotin compounds comprises reducing tin tetraorganotin compounds comprises reducing tin tetrahalide in the presence of lithium aluminum hydride reducing agent or reducing stannous chloride in the presence of sodium borohydride to produce stannane, $SnH_4$, catalytically reacting said stannane, $SnH_4$, and a compound selected from the group consisting of a α-unsaturated olefinic compounds in the presence of a catalyst and recovering said tetraorganotin compounds.

Catalysts operable in the practice of this invention include: mixtures of cobalt soaps of organic acids exhibiting more than 6 carbon atoms with alkyl peroxides or hydroperoxides; hexachloroplatinic acid; and mixtures of palladium and charcoal.

According to one of its aspects, this invention for producing tetraorganotin compounds comprising reacting stannane, $SnH_4$, and a compound selected from the group consisting of αα-olefinic compounds and cycloolefinic compounds in the presence of a catalyst and recovering said tetraorganotin compounds.

Specific catalysts operable in reacting stannane, $SnH_4$, with α-unsaturated olefinic compounds and cycloolefinic compounds include mixtures of cobalt naphthenate and di-t-butyl peroxide and mixtures of cobalt naphthenate and tertiary butyl hydroperoxide. Other specific catalysts include chloroplatinic acid and mixtures of palladium and charcoal.

The addition reaction of stannane, $SnH_4$, may be practiced with α-unsaturated olefins of the formula $H_2C=CH-R'$ in which $R'$ may contain various functional groups.

The reactant α-unsaturated olefins operable in the practice of this invention include ethylene, propylene, butene-1, isobutene-1, pentene-1, hexene-1, heptene-1, and octene-1; substituted olefins such as acrylonitrile and cyclic olefins such as acrylonitrile and cyclic olefins such as cyclohexene.

In the compound $R_4Sn$, R is selected from the group consisting of, generally, lower substituted and unsubstituted alkyl and cycloalkyl groups.

When R is alkyl it may include ethyl, n-propyl, isobutyl, n-butyl, amyls, octyls, etc. When R is cycloalkyl it may include cyclohexyl, cycloheptyl, etc.

Stannane, $SnH_4$, may be prepared by reacting tin tetrachloride, tin tetrabromide or tin tetraiodide with lithium aluminum hydride in the presence of a nitrogen atmosphere containing about 0.1 percent oxygen. Stannane, $SnH_4$, may also be produced by reducing stannous chloride in the presence of sodium borohydride.

In practicing the first step of this invention a tin tetrahalide compound is reduced to stannane, $SnH_4$, in the presence of lithium aluminum hydride. The reduction may be preferably conducted, initially, at a temperature of $-195°$ C. maintained by immersion of the reaction vessel, or trap, in a liquid nitrogen bath. The reduction is preferably carried out in a nitrogen atmosphere containing approximately 0.1 percent, by weight, oxygen. The reduction of tin tetrahalide may be conducted in the presence of an inert diluent or solvent, e.g. diethyl ether, tetrahydrofuran, tetrahydropyran, 2-methyl tetrahydrofuran and 2-ethoxytetrahydropyran.

TIn carrying out the reduction of tin tetrahalide, said tin halide should be contacted with lithium aluminum hydride at a temperature ranging from $-200$ C. to $20°$ C. The temperature, initially, is preferably near $-200°$ C. and is preferably elevated slowly to $-70°$ C. to avoid decomposing that stannane which is the product of the reduction step. It is noted that the melting point of stannane, $SnH_4$, is $-146°$ C. and the boiling point is $-52.5°$ C.

In reducing tin tetrahalide to stannane, $SnH_4$, the molar ratio of reducing agent to tin tetrahalide should be greater than unity, preferably 2 or 3 to 1.

During the reduction step, the following typical reaction may occur: $SnCl_4 + LiAlH_4 \rightarrow SnH_4 + LiAlCl_4$.

The practice of the second step of this invention may be effected by condensing an α-unsaturated olefin, or a cycloolefinic compound into a reaction vessel or trap, containing suitable catalysts; the vessel may be preferably immersed in liquid nitrogen, the liquid nitrogen exhibiting a temperature of approximately $-195°$ C.

The reaction may proceed as follows: combination catalyst and initiator, e.g. cobalt naphthenate and ditertiary butyl peroxide are added to a reaction vessel in a liquid nitrogen bath. The vessel is cooled to approximately $-195°$ C. by the liquid nitrogen bath. Stannane, $SnH_4$, is then added followed by the addition of an unsaturated organic compound. The reaction temperature may be adjusted to a higher temperature, circa. $-78°$ C. by transferring the reaction temperature vessel or trap, from the liquid nitrogen bath (at $-195°$ C.) to a dry ice acetone bath at approximately $-78°$ C.; and thereafter, to an ice-methanol bath at $-22°$ C. After removing the reaction mixture from the ice-methanol bath, the temperature is allowed to rise to room temperature. Unreacted stannane, $SnH_4$, may be collected in conventional traps outside the reaction zone. The reaction mass may be filtered to separate the product from the catalyst.

Solvents or diluents suitable as the reaction medium of this invention include aliphatic hydrocarbons, aromatic hydrocarbons and ethers. The foregoing may contain carboxylic esters, carboxylic amides, and nitrile groups as substituents. Aromatic amino groups, but not aliphatic amino groups, may also be present as substituents. Among the suitable solvents are diethyl ether and tetrahydrofuran.

Practice of this invention may be observed from the following illustrative examples.

EXAMPLE 1

A 250 milliliter two-necked flask was placed in a liquid nitrogen bath at $-196°$ C. The atmosphere surrounding the system was nitrogen containing 0.1 percent oxygen, 6.5 grams (0.025 mole) of tin tetrachloride and 4.8 grams (0.125 mole) of lithium aluminum hydride. The temperature of the reaction vessel was slowly increased and at $-62°$ C. ebullition of gas was observed. The temperature was slowly and incrementally increased to room temperature, $27°$ C., whereupon the stannane, $SnH_4$, product was collected in traps. The stannane product exhibited a weight of 2.65 grams, an 87.2 percent yield. To a trap with a removable head was added 60 milligrams of di-tertiary butyl peroxide and 150 milligrams of a hydrocarbon solution containing 6.0 percent cobalt naphthenate (9 milligrams of cobalt naphthenate).

The reaction trap was then placed in a liquid nitrogen bath exhibiting a temperature of $-195°$ C. 2.65 grams (0.222 mole of stannane, $SnH_4$, were added to the reaction vessel, followed by the addition of 60 grams (0.11 mole) of n-butene-1. The temperature of the reaction mass was then adjusted by sequentially transferring the reaction vessel from the liquid nitrogen bath to a dry ice-acetone bath exhibiting a temperature of approximately $-78°$ C. and then to an ice-methanol bath at $-22°$ C. The temperature of the reaction vessel was then allowed to rise to room temperature. The product tetra-n-butyltin exhibited a weight of 2.24 grams (29.4 percent yield) and an index of refraction 1.4696 (the literature $n_D^{20}$ 1.4727). The identification of the product was confirmed by infrared spectroscopic analysis and vapor-phase chromatographic analysis.

EXAMPLE 2

The preparation of tetraethyltin

The procedure of example 1 was followed except that 4.8 grams (0.125 mole) of lithium aluminum hydride and 6.5 grams of tin tetrahalide were charged to the reactor for the generation of 2.6 grams of stannane, $SnH_4$. For the reaction of ethylene with said 2.6 grams of stannane, $SnH_4$, the reactor was charged with 3.0 grams (0.11 mole) of ethylene, 150 milligrams of a 6 percent solution of cobalt naphthenate in hydrocarbon, and 90 milligrams of tertiary butyl hydroperoxide. The product, tetraethyltin, exhibited a weight of 1.65 grams, a yield of 33.5 percent; a refractive index of $n_D^{30}=1.4666$. The identification of the product was confirmed by vapor-phase chromatographic analysis.

EXAMPLE 3

The Preparation of tetracyclohexyltin

The procedure of example 1 was followed except that the reactor was charged with 2.7 grams (0.022 mole) of stannane, $SnH_4$, and 8.0 grams of cyclohexene. The solid product, tetracyclohexyltin, exhibited a weight of 0.82 grams, a melting point range of 261° C. (the theoretical melting point being 262° C. -263°C.) the identification of the product was confirmed by infrared spectroscopic analysis.

EXAMPLE 4

The Preparation of tetrapropyltin

The procedure of example 1 was followed except that the reactor was charged with 2.6 grams of stannane, $SnH_4$, and 4.0 grams of propylene. The product, tetrapropyltin exhibited a weight of 1.2 grams (a crude yield of 19.7 percent) and a refractive index of $nD^{25}=1.4712$. The identification of the product was confirmed by vapor-phase chromatographic analysis.

EXAMPLE 5

The Preparation of tetracyanoethyltin

The procedure of example 1 was followed except that the reactor was charged with 2.55 grams of stannane, $SnH_4$, 4.5 grams (0.084 mole) of acrylonitrile 300 milligrams of cobalt naphthelate and 180 milligrams of tertiary butyl peroxide. The product tetracyanoethyltin, a clear yellow oil, exhibited a weight of 0.6 grams (a crude yield of 8.6 percent) and a refractive index of $n D^{25}=1.5312$.

EXAMPLE 6

The preparation of tetraisobutyltin

The procedure of example 1 was followed except that the reactor was charged with 2.35 grams of stannane, $SnH_4$, 5.0 grams (0.09 mole) of isobutylene, 150 milligrams of a 6 percent solution of cobalt naphthenate in hydrocarbon and 90 milligrams of tertiary butyl hydroperoxide. The product tetraisobutylin exhibited a weight of 0.5 grams a yield of 14.4 percent. The identification of the product was confirmed by infrared spectroscopic analysis

EXAMPLE 7

The Preparation of tetrabutyltin

The procedure of example 1 was followed except that the reactor was charged with 2.5 grams of stannane, $SnH_4$, 4.5 grams (0.08 mole) of butene-1, and instead of a catalyst mixture of di-tertiary butyl peroxide and cobalt naphthenate, 0.25 grams of hexaclorplatinic acid was used. The product tetrabutyltin exhibited a weight of 1.6 grams, a crude yield of 23.2 percent , a refractive index of $n_D^{25}=1.4705$. The identification of the product was confirmed by vapor-phase chromatographic analysis.

EXAMPLE 8

The Preparation of Tetrabutyltin

The procedure of example 1 was followed except that the stannane, $SnH_4$, generated exhibited a weight of 2.55 grams, an 83.1 percent yield, and that 60 milligrams of tertiary butyl peroxide and 150 milligrams of 6 percent solution of cobalt naphthelate in hydrocarbon were used instead of the catalyst mixture of example 1. The product, tetrabutyltin, exhibited a weight of 2.36 grams and a refractive index of $n_D^{26}=1.4694$. The identification of the product was confirmed by infrared spectroscopic analysis and vapor-phase chromatographic analysis.

EXAMPLE 9

The Preparation of Tetrabutyltin Using Palladium As Catalyst

The procedure of example 1 was followed except that the reaction of 2.4 grams of stannane, $SnH_4$, and 4.6 grams (0.08 moles 0 of butene-1 was catalyzed by 0.2 grams of charcoal impregnated with 10 percent, by weight, palladium. The product, tetrabutyltin, after filtration exhibited a weight of 2.2 grams and a refractive index of $n_D^{26}=1.4709$.

EXAMPLE 10

The Preparation Of Tetrabutyltin Catalyzed By Tertiary Butyl Hydroperoxide

The procedure of example 1 was used except that tertiary butyl hydroperoxide was used instead of di-tertiary butyl hydroperoxide was used instead of ditertiary butyl peroxide. The product, tetrabutylin, exhibited a weight of 3.46 grams, a yield of 47.4 percent, and a refractive index of $nD^{26}=1.4697$. The identification of the product was confirmed by vapor-phase chromatographic analysis.

EXAMPLE 11

The Preparation Of tetraoctyltin

The procedure of example was followed except that 2.65 grams (0.021 mole) of stannane, $SnH_4$, and 10.0 grams (0.084 mole of octene-1 were charged to the reactor. The product, tetroctyltin, exhibited a weight of 0.75 grams and an index of refraction of $n_D D^{20}=1.4688$.

Although this invention has been illustrated by reference to specific examples, modifications thereof which are clearly within the scope of the invention will be apparent to those skilled in the art.

We claim:

1. A method for producing tetraorganotin compounds comprising placing a compound selected from the group consisting of α-unsaturated olefinic compounds and cycloolefinic compounds selected from the group consisting of ethylene, isobutylene, propylene, butene-1, isobutene-1, pentene-1, hexene-1, octene-1, acrylonitrile, cyclohexene, and cycloheptene in a reaction zone with a catalyst selected from the group consisting of mixtures of cobalt soaps of an organic acid exhibiting 6 carbon atoms and alkyl peroxides, mixtures of cobalt soaps of an organic acid exhibiting 6 carbon atoms and hydroperoxides, hexachloroplatinic acid, and mixtures of palladium and charcoal; adding stannane, $SnH_4$, to said reaction zone; reacting said stannane, $SnH_4$, with said compound in the presence of said catalyst for producing a tetraorganotin compound; and withdrawing said tetraorganotin compound from said reaction zone.

2. A method as described in claim 1 in which the temperature of the said reaction zone is maintained in the range of between about −195° C. and −22° C.

3. A method for producing tetraorganotin compounds comprising placing tin tetrahalide in a first reaction zone; adding lithium aluminum hydride to said first reaction zone; reducing said tin tetrahalide in said first reaction zone while maintaining the temperature thereof in the range of between about −200° C. and 70° C. to produce stannane, SnH$_4$; placing a compound selected from the group consisting of α-unsaturated olefinic compounds and cycloolefinic compounds selected from the group consisting of ethylene, isobutylene, propylene, butene-1, isobutene-1, pentene-1, hexene-1, hepten-1, octene-1, acrylonitrile, cyclohexene, and cycloheptene in a second reaction zone with a catalyst selected from the group consisting of mixtures of cobalt soaps of an organic acid exhibiting 6 carbon atoms and alkyl peroxides, mixtures of cobalt soaps of an organic acid exhibiting 6 carbon atoms and hydroperoxides, hexachloroplatinic acid, and mixtures of palladium and charcoal adding the said stannane, SnH$_4$, produced in said first reaction zone to said second reaction zone; reacting said stannane, SnH$_4$, with said member selected from the group consisting of α-unsaturated olefinic compounds and cycloolefinic compounds in the presence of said catalyst for producing a tetraorganotin compound; and withdrawing said tetraorganotin compound from said reaction zone.

4. A method as described in claim 3 in which the temperature of the said second reaction zone is maintained in the range of between about −195° C. and −22° C.

5. The method of claim 1 wherein said catalyst comprises hexachloroplatinic acid.

6. The method of claim 1 wherein said catalyst comprises mixtures of palladium and charcoal.

7 The method of claim 1 wherein said tetraorganotin compound is tetraethyltin.

8. The method of claim 1 wherein said tetraorganotin compound is tetreapropyltin.

9. The method of claim 1 wherein said tetraorganotin compound is tetrabutyltin.

10. The method of claim 1 wherein said tetraorganotin compound is tetracyanoethyltin.

11. The method of claim 1 wherein said tetraorganotin compound is tetractyltin.

12. The method of claim 1 wherein said tetraorganotin compound is tetracyclohexyltin.

13. The method of claim 3 wherein said catalyst comprises hexachlorplatinic acid.

14. The method of claim 3 wherein said catalyst comprises mixtures of palladium and charcoal.

UNITED STATES PATENT OFFICE
CERTIFICATE OF CORRECTION

Patent No. 3,607,892           Dated 9/21/71

Inventor(s) Gerald H. Reifenberg & William J. Considine

It is certified that error appears in the above-identified patent and that said Letters Patent are hereby corrected as shown below:

column 1, line 1, for "stanne" read --stannane--.

Column 1, line 28, for "αα-olefinic" read --α-olefinic--.

Column 5, line 12, following "charcoal" insert --;--.

Column 6, line 8, for "tetreapropyltin" read --tetrapropyltin--.

Column 6, line 15, for "teractyltin" read --tetraoctyltin--.

Column 6, line 19, for "hexachlorplatinic" read --hexachloroplatinic--.

Signed and sealed this 14th day of March 1972.

(SEAL)
Attest:

EDWARD M. FLETCHER, JR.
Attesting Officer

ROBERT GOTTSCHALK
Commissioner of Patents